United States Patent
Karamavruc et al.

(10) Patent No.: US 8,327,636 B2
(45) Date of Patent: Dec. 11, 2012

(54) TORQUE CONVERTER HAVING BLADES ON THE COVER

(75) Inventors: Aliihsan Karamavruc, Wooster, OH (US); Andre Soto, Tallmadge, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1026 days.

(21) Appl. No.: 12/316,989

(22) Filed: Dec. 18, 2008

(65) Prior Publication Data

US 2009/0178398 A1    Jul. 16, 2009

Related U.S. Application Data

(60) Provisional application No. 61/008,372, filed on Dec. 20, 2007.

(51) Int. Cl.
*F16D 33/00*    (2006.01)

(52) U.S. Cl. .......................................................... 60/365
(58) Field of Classification Search ................... 60/333, 60/364, 365, 366; 477/52, 53; 192/3.29
See application file for complete search history.

(56) References Cited

U.S. PATENT DOCUMENTS

| 5,655,368 A * | 8/1997 | Koike et al. ..................... 60/365 |
| 5,662,194 A | 9/1997 | Jackel |
| 5,996,750 A | 12/1999 | Roshangar |
| 2007/0012537 A1 | 1/2007 | Krause et al. |

* cited by examiner

*Primary Examiner* — Michael Leslie
(74) *Attorney, Agent, or Firm* — Davidson, Davidson & Kappel, LLC

(57) ABSTRACT

A torque converter including a turbine, a vibration damper, a cover, the cover having blades, and a clutch pack, the blades increasing a fluid flow toward or away from the clutch pack.

11 Claims, 4 Drawing Sheets

TORQUE CONVERTER HAVING BLADES ON THE COVER

Priority to U.S. Provisional Patent Application Ser. No. 61/008,372, filed Dec. 20, 2007, is claimed, the entire disclosure of which is hereby incorporated by reference herein.

The present invention relates to torque converters and more particularly to torque converters having lock-up clutches.

BACKGROUND

In the prior art, the cooling flow of torque converters and torque converter clutches is forced via hydraulic pressure through the friction facings or facings due to sealing plates. This force to go through the friction plates affects the cooling efficiency. The cooling efficiency depends on factors such as the friction materials, groove patterns and the amount of cooling flow. Reference may be made to U.S. Pat. Nos. 5,662,194 and 5,996,750 and U.S. Patent Publication No. 2007/0012537, all of which are hereby incorporated by reference herein.

SUMMARY OF THE INVENTION

A torque converter including a turbine, a vibration damper, a cover, the cover having blades, and a clutch pack, the blades increasing a fluid flow toward or away from the clutch pack.

BRIEF DESCRIPTION OF THE DRAWINGS

The present invention will be described further with respect to one embodiment using the figures, in which.

DETAILED DESCRIPTION

Figure 1:
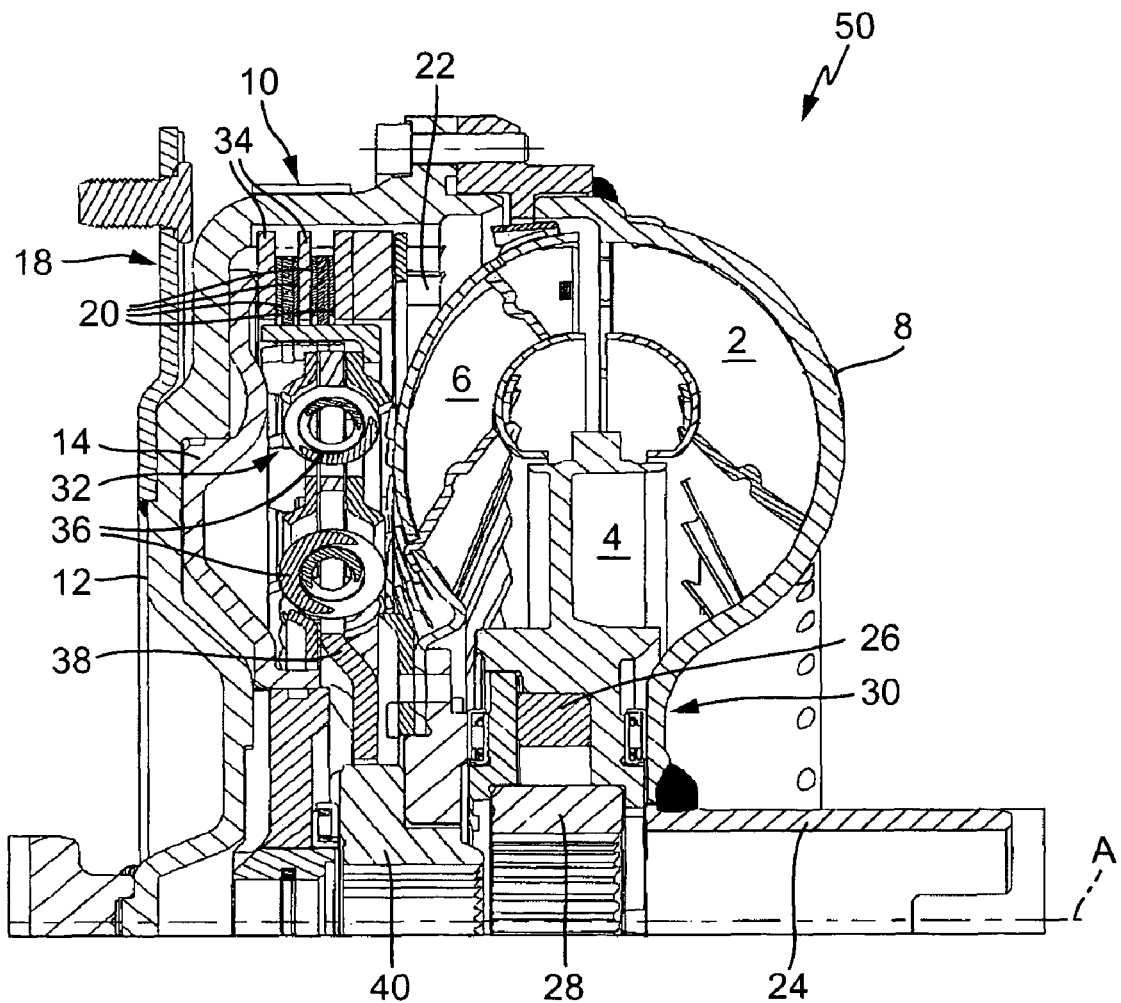
FIG. 1 is a cross sectional view of one embodiment of a torque converter of the present invention.

FIG. 1 shows a cross sectional view of a torque converter 50 embodying the present invention. Torque converter 50 includes a cover 12 connected to a crankshaft of the engine and a pump shell 8 connected to cover 12. Pump shell 8 and cover 12 may be welded. Pump shell 8 encloses pump 2. Pump shell 8 is attached to pump hub 24. Enclosed by cover 12 is a turbine 6, a stator 4, a vibration damper 32 and a lock up clutch 18. Cover 12 has blades 22 which drive the direction of a secondary fluid flow S. Blades 22 are located on the portion of cover 12 closest to turbine 6. Stator 4 is mounted on a one-way clutch 30 with an outer race 26 and an inner race 28. Vibration damper 32 has springs 36 and a drive plate 38. Drive plate is splined to turbine hub 40. Lock up clutch 18 includes a piston 14 and a clutch pack 10. Clutch pack 10 includes clutch linings 20 and a clutch plate 34. Grooves are pressed into clutch linings 20.

Figure 2:
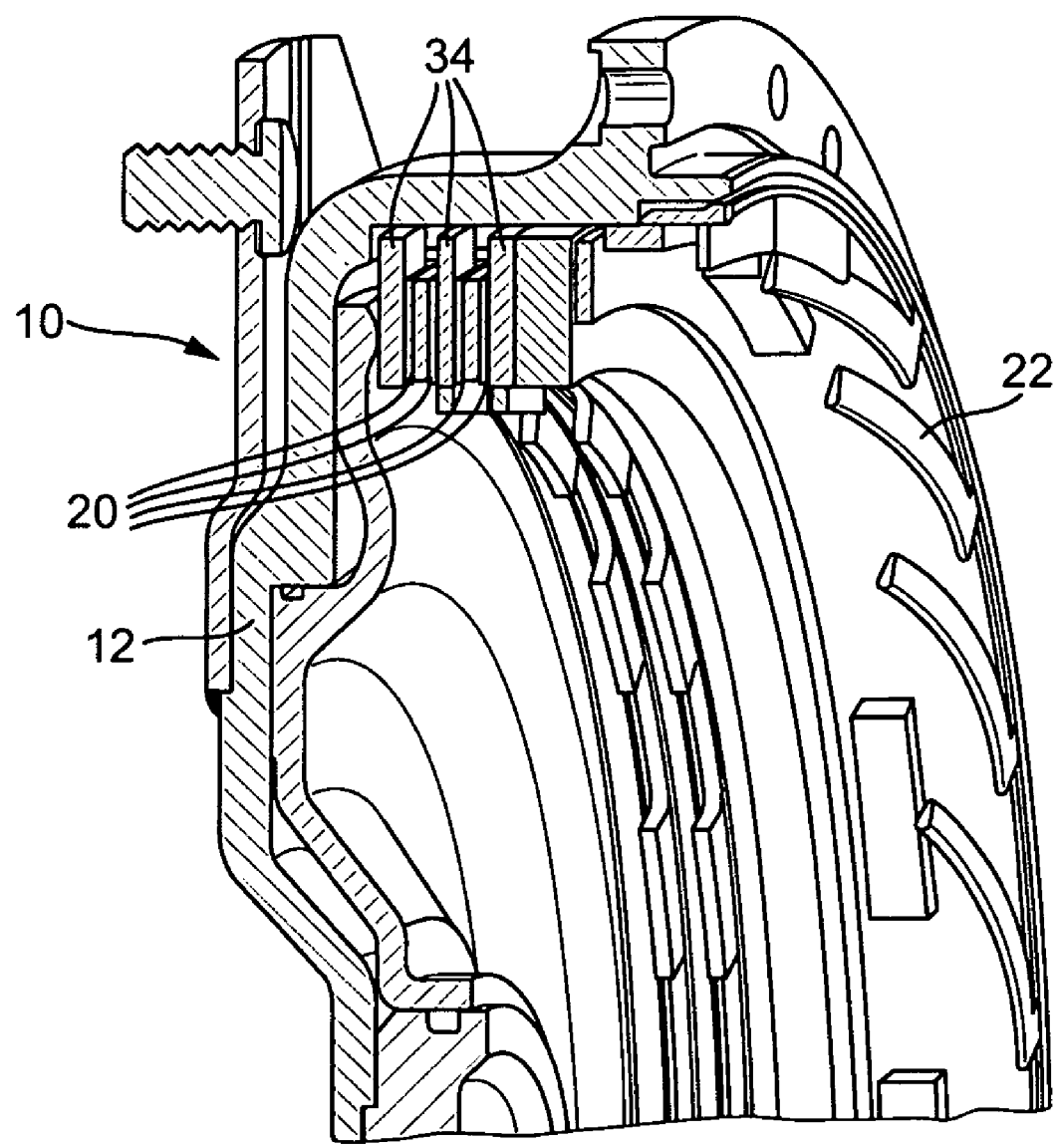
FIG. 2 is an exploded view of the cover and clutch pack in FIG. 1.

FIG. 2 shows an exploded view of cover 12. Blades 22 are on cover 12. Blades 22 can be oriented towards an axis A (FIG. 1) or away from axis A. Depending on the orientation of blades 22 determines whether the flow is propelled axially towards the clutch pack 10 including linings 20 or away from clutch pack 10.

Figure 3A:
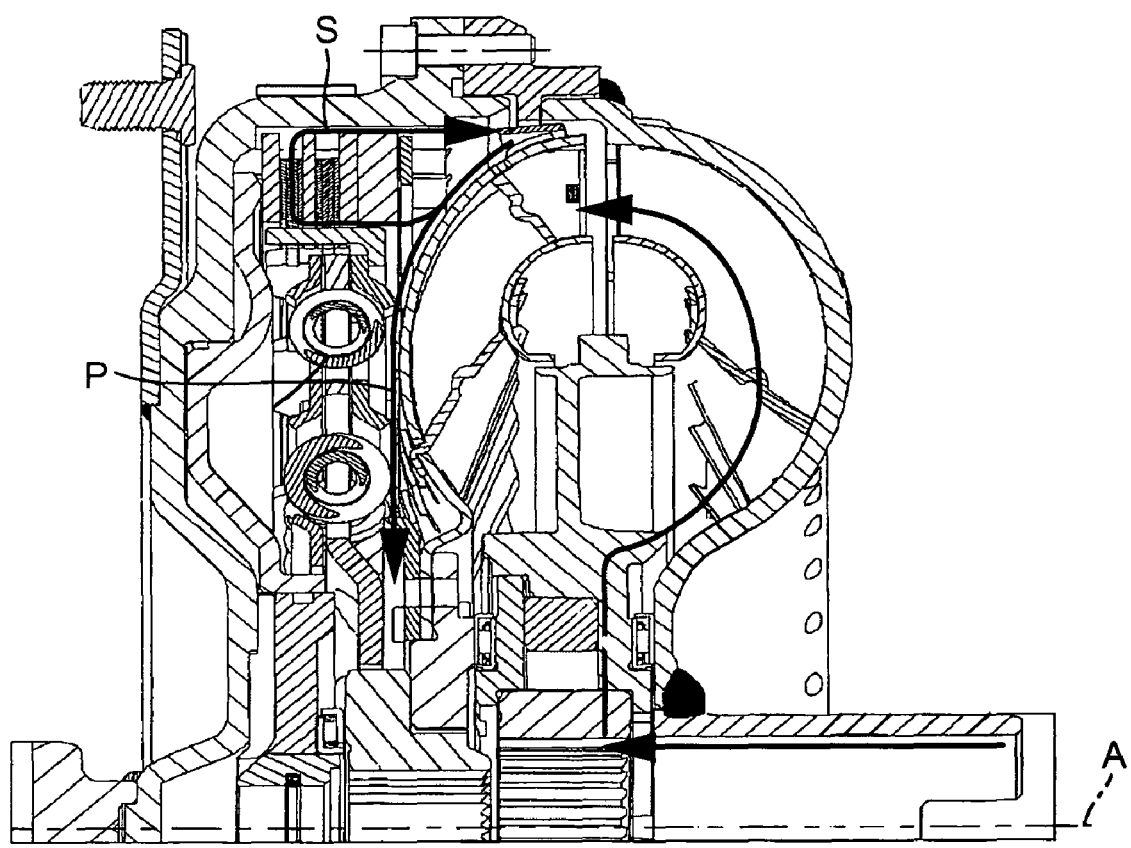
FIG. 3a is a cross sectional view of one embodiment of a torque converter of the present invention illustrating the primary and secondary fluid flow with the blades facing outwards.
Figure 3B:
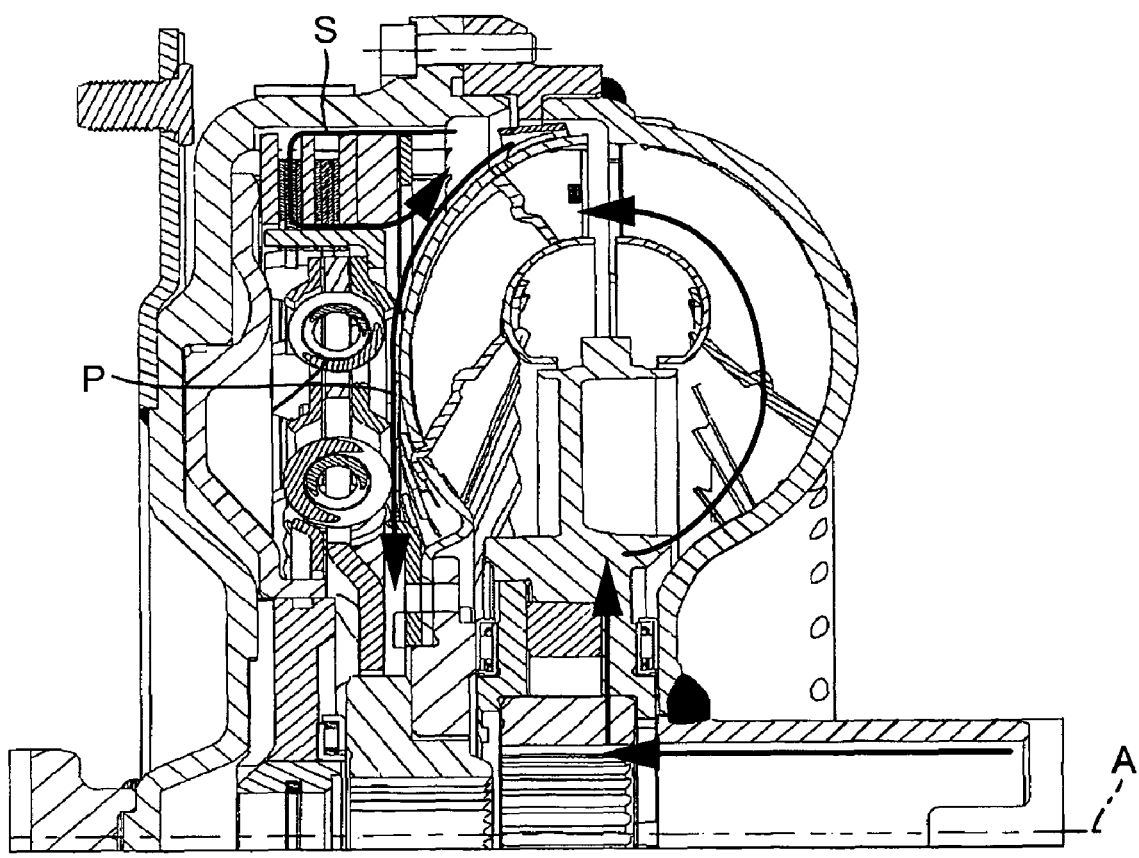
FIG. 3b is a cross sectional view of one embodiment of a torque converter of the present invention illustrating the primary and secondary fluid flow with the blades facing inwards.

FIG. 3a and 3b show the primary and secondary fluid flow of an embodiment of torque converter 50 in the present invention. Torque converter 50 may have two fluid flows, a primary flow P and secondary flow S. Primary flow P may go around inner race 28 and outer race 26 of one way clutch 30, stator 4, pump 2 and turbine 6. Primary flow P may continue to flow toward axis A in between turbine 6 and vibration damper 32 toward turbine hub 40. Cover 12 has blades 22 on the interior of cover 12 which drive the direction of secondary flow S. Secondary flow S may be directed by blades 22 in order to increase the fluid flow in clutch pack 10. Secondary flow S is pushed into clutch pack 10 or pulled by suction through clutch pack 10 depending on the design of blades 22. Flow may not be forced to go through friction linings 20, but rather flow is circulated through clutch pack 10 where flow is scavenged from primary circulating flow P. Fluid flow in clutch pack 10 flows through friction linings 20. Blades 22 facing axially inward toward axis A would circulate the fluid flow in clutch pack 10 in a clockwise direction (See FIG. 3a), while blades 22 facing axially outward from axis A would have a greater fluid flow to clutch pack 10 counterclockwise (See FIG. 3b) through to friction linings 20.

What is claimed is:

1. A torque converter comprising:
   a turbine;
   a vibration damper;
   a cover, the cover having blades; and
   a clutch pack, the blades increasing a fluid flow toward the clutch pack,
   wherein the blades face axially inward toward the clutch pack.

2. The torque converter as recited in claim 1 further comprising a primary fluid flow bypassing the clutch pack and a secondary fluid flow passing through the clutch pack.

3. The torque converter as recited in claim 2 wherein the primary fluid flow is between the turbine and vibration damper.

4. The torque converter as recited in claim 1 wherein the blades increase fluid flow away from the clutch pack.

5. The torque converter as recited in claim 1 wherein the clutch pack has clutch linings.

6. A torque converter comprising:
   a turbine;
   a vibration damper;
   a cover, the cover having blades; and
   a clutch pack, the blades increasing a fluid flow away from the clutch pack,
   wherein the blades face axially outward away from the clutch pack.

7. The torque converter as recited in claim 6 further comprising a primary fluid flow bypassing the clutch pack and a secondary fluid flow passing through the clutch pack.

8. The torque converter as recited in claim 7 wherein the primary fluid flow is between the turbine and vibration damper.

9. The torque converter as recited in claim 6 wherein the blades increase fluid flow toward the clutch pack.

10. The torque converter as recited in claim 6 wherein the clutch pack has clutch linings.

11. A method for operating a torque converter comprising:
directing a primary torque converter fluid flow, the fluid flow bypassing a lock-up clutch pack; and
using blades connected to a cover of the torque converter to increase a secondary flow off of the primary flow to pass through the clutch pack, the blades facing axially inward toward the clutch pack or axially outward away from the clutch pack.

* * * * *